Feb. 6, 1923.

T. V. BUCKWALTER.
METHOD OF MAKING CAGES FOR BEARINGS.
ORIGINAL FILED JULY 18, 1918.

1,444,326.

2 SHEETS—SHEET 1.

Inventor
Tracy V. Buckwalter,
By Butler Denny
Attorneys

Inventor:
Tracy V. Buckwalter,
By
Attorneys.

Patented Feb. 6, 1923.

1,444,326

UNITED STATES PATENT OFFICE.

TRACY V. BUCKWALTER, OF CANTON, OHIO, ASSIGNOR TO THE TIMKEN ROLLER BEARING COMPANY, OF CANTON, OHIO, A CORPORATION OF OHIO.

METHOD OF MAKING CAGES FOR BEARINGS.

Original application filed July 18, 1918, Serial No. 245,448. Divided and this application filed August 15, 1921. Serial No. 492,445.

*To all whom it may concern:*

Be it known that I, TRACY V. BUCKWALTER, a citizen of the United States, residing at Canton, in the county of Stark and State of Ohio, have invented an Improved Method of Making Cages for Bearings, of which the following is a specification.

This invention relates to anti-friction bearings and it comprises an improved cage (for which I have made application for Letters Patent of the United States, Serial No. 245,448) now Patent 1,395,385, Nov. 1, 1921, of which the present application is a division made and assembled in the bearing by an improved method.

Primary objects of the improvements are to provide a cage that will conform better to the contour of the rollers with improved control thereof, permit the use of an increased number of rollers under given conditions, reduce the weight of the cage required for a given use, and reduce the number of operations, together with the cost of manufacture.

In the manufacture of cages for cone bearings in accordance with my invention, as preferably practiced, the operations comprise cutting metal tubing of the required character into tubular sections of the required length, die shaping the sections to the desired conical forms, perforating the conical blanks to provide roughly seats separated by bridges for the rollers, and forming such bridges and seats approximately to the contour of and so as to control the rollers, the forming operations comprising not only the production of the desired contact surfaces but also the bending of the bridges to facilitate assembly of the parts if desired.

The operations may be varied as, for instance, by stamping blanks out of flat stock and pressing such blanks to conical form.

The characteristic features of my improvements are fully set forth in the following description and the accompanying drawings in illustration thereof.

Figure 1:
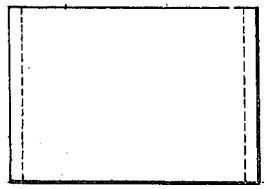
Figure 3:
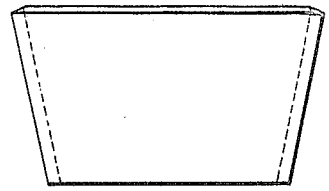
Figure 2:
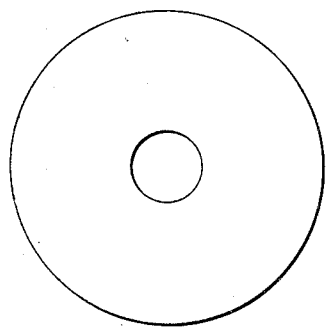
Figure 4:
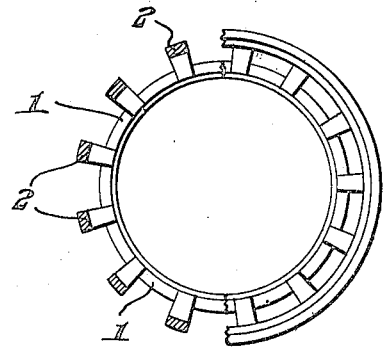
Figure 5:
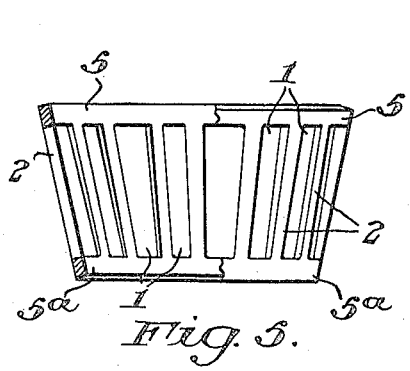
Figure 6:
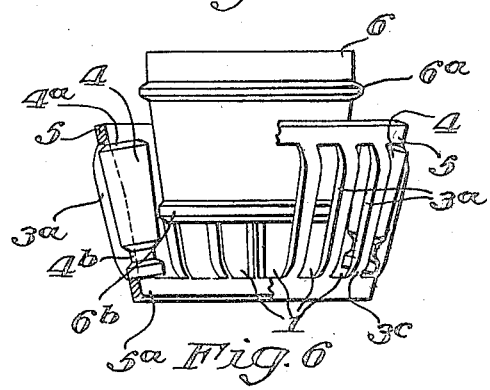
Figure 7:
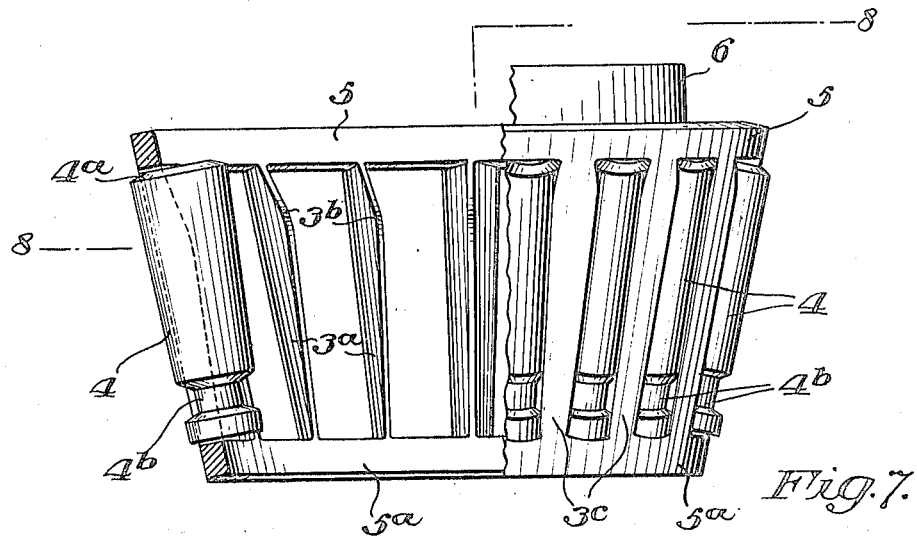
Figure 8:
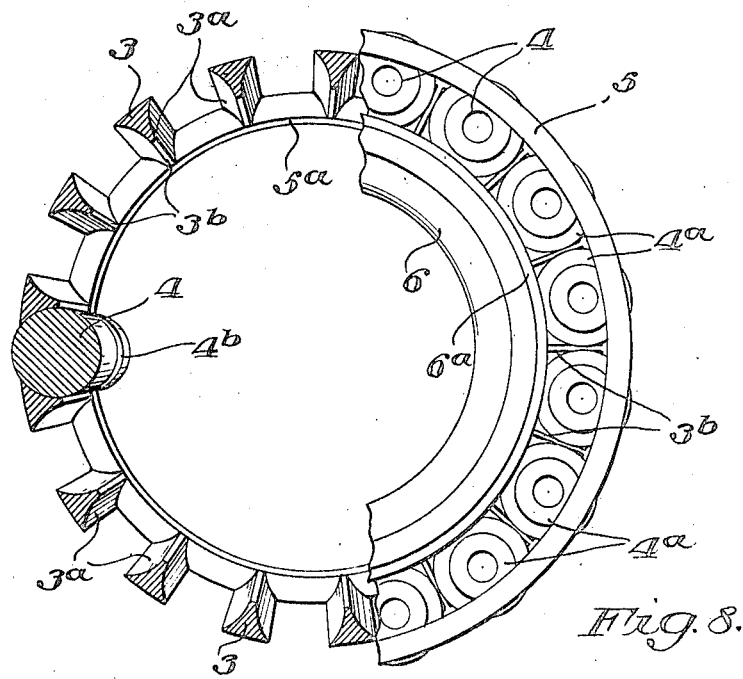

In the drawing, Fig. 1 is a side view of a cylindrical section of tubing of the character required for making a cage; Fig. 2 is a disk cut from flat stock from which the cage may be pressed; Fig. 3 is a side elevation of a cage blank produced by shaping the sections shown in Fig. 1 or 2; Fig. 4 is a part sectional end view of the conical blank of Fig. 2 after perforation to produce roughly the seats and bridges for holding the rollers; Fig. 5 is a broken side elevation of the perforated cage shown in Fig. 4; Fig. 6 is a broken side elevation of a bearing in process of assembly with the bridges of the cage pressed to form and bent outwardly to facilitate the assembly of the parts; Fig. 7 is a broken side elevation of a finished bearing made in accordance with my improvements; and Fig. 8 is a part sectional end view taken on the line 8—8 of Fig. 7.

The cylindrical blank of Fig. 1 and the flat disk of Fig. 2 are pressed by means of dies to produce the conical blank of Fig. 3, and the latter is perforated by punching to produce the cage blank of Figs. 4 and 5, containing the apertures 1 separated by the ribs 2, which are parallel to the cone elements and approximately rectangular in cross section as shown here. The ribs 2 are cold pressed to flow the metal and provide the bridges 3, is illustrated in Figs. 6 to 8 inclusive. These bridges 3 have respectively the concave conical surfaces $3^a$ converging inwardly to the inner edges $3^b$ which are projected or bowed inwardly by extrusion of the metal, the outer surfaces $3^c$ of such ribs being expanded by the operation. The adjacent surfaces of adjacent bridges thus formed provide conical bearings conforming to the surfaces of the respective rollers 4 to be seated between them and to be limited in end movement by the continuous circular ends 5 and $5^a$ of the cages which form the ends of the seats.

As illustrated in Fig. 6, in the assembly of the bearing, the bridges 3 may be bent outwardly and the rollers 4 entered in the seats formed thereby to facilitate the entry of the cone 6, the latter being provided at its larger end with the circular rib $6^a$ for engaging the conical surfaces $4^a$ at the larger ends of the rollers and at its smaller end with the concentric circular rib $6^b$ for engaging the circular grooves or channels $4^b$ in the smaller ends of the rollers.

After the assemblage of the parts, the bridges 3 are bent inwardly so that their surfaces $3^a$ conform to the surfaces of the rollers with a working clearance of say .005″ over the surfaces of the rollers and the latter being controlled thereby so as to maintain their correct working relations. It will be observed that the control exercised upon the rollers is facilitated by the comparatively large arc of the curved surfaces of the bridges, such surfaces being extended by the described extrusion or expansion of the metal so that the outer surfaces of such ribs are spread and the inner edges project beyond the usual or general interior contour which would be indicated by the surface of the cone contacting with the inner surfaces of the parts 5 and 5ª.

Having described my invention, I claim:

1. The method of making cages for anti-friction bearings which consists in pressing a blank to a desired form, perforating said form to provide apertures separated by ribs, and shaping said ribs by flowing the metal thereof so as to provide surfaces conforming substantially with the surfaces of rolling devices adapted to be engaged thereby.

2. The method of making a solid cage for conical roller bearings which consists in pressing a blank to the form of a cone, punching said cone with the removal of metal sections to form end rings with connecting bridges providing apertures to form roller seats, and pressing toward each other the inner edges of each bridge so as to provide bearing surfaces for said rollers.

3. The method of making cages for anti-friction bearings which comprises the production of a conical blank having ribs separated by apertures and pressing said ribs so as to expand the outer parts thereof and contract the bodies thereof from said outer parts to inwardly projecting edges, with the production of converging conical surfaces.

4. The method which consists in forming a cage having ribs separated by apertures, pressing said ribs outwardly, placing rollers in said apertures, placing a bearing element within the circle of said rollers, and pressing said ribs inwardly to engage said rollers with said bearing element.

5. The method of making cages for roller bearings which consists in pressing a cage blank to predetermined form, punching said blank so as to produce roller apertures separated by ribs, and forming said ribs so as to conform with the surfaces of rollers disposed in said apertures.

In testimony whereof I have hereunto set my name this 9th day of August, 1921.

TRACY V. BUCKWALTER.